(12) United States Patent
Yoshida et al.

(10) Patent No.: US 12,529,666 B2
(45) Date of Patent: Jan. 20, 2026

(54) FLUID STATE DETECTION SENSOR

(71) Applicant: KYB CORPORATION, Tokyo (JP)

(72) Inventors: Takahiro Yoshida, Kanagawa (JP);
Yukinori Kameda, Kanagawa (JP);
Yuki Nagai, Kanagawa (JP); Ryohei Nakamura, Kanagawa (JP)

(73) Assignee: KYB Corporation, Tokyo (JP)

( * ) Notice: Subject to any disclaimer, the term of this patent is extended or adjusted under 35 U.S.C. 154(b) by 280 days.

(21) Appl. No.: 18/283,142

(22) PCT Filed: Mar. 11, 2022

(86) PCT No.: PCT/JP2022/011150
§ 371 (c)(1),
(2) Date: Sep. 20, 2023

(87) PCT Pub. No.: WO2022/209800
PCT Pub. Date: Oct. 6, 2022

(65) Prior Publication Data
US 2024/0167972 A1    May 23, 2024

(30) Foreign Application Priority Data

Mar. 30, 2021  (JP) .................. 2021-057047

(51) Int. Cl.
*G01N 27/02*    (2006.01)
*G01N 27/06*    (2006.01)
(Continued)

(52) U.S. Cl.
CPC .......... *G01N 27/028* (2013.01); *G01N 27/06* (2013.01); *G01N 27/228* (2013.01); *G01N 33/28* (2013.01)

(58) Field of Classification Search
CPC .... G01N 27/06; G01N 27/028; G01N 27/228; G01N 27/221; G01N 33/28
See application file for complete search history.

(56) References Cited

U.S. PATENT DOCUMENTS

| 2018/0372661 A1 | 12/2018 | Yoshida et al. |
| 2020/0003599 A1 | 1/2020 | Theuveny et al. |
| 2020/0033281 A1* | 1/2020 | Yoshida ................. G01N 27/10 |

FOREIGN PATENT DOCUMENTS

| JP | 11-270787 A * | 10/1999 |
| JP | 2017198528 A | 11/2017 |

(Continued)

*Primary Examiner* — Paul M. West
(74) *Attorney, Agent, or Firm* — BainwoodHuang (57) ABSTRACT

A fluid state detection sensor accurately detects a fluid state by suppressing the deterioration of a conductivity measurement accuracy due to its characteristics. The sensor includes an electrode section configured by a pair of electrodes arranged opposite each other, a conductivity acquisition unit detecting a resistance value from an inter-electrode voltage value acquired through the electrode section and acquiring a fluid conductivity, a controller executing entire sensor's processing according to a control program stored in ROM etc., a memory storing correction values for fluid whose conductivity is greater than a predetermined value calculated by a conductivity calculator, which calculates the fluid conductivity from the inter-electrode voltage value, a corrector correcting the conductivity calculator calculated conductivity using the correction value stored in the memory when the fluid whose conductivity calculator calculated conductivity is greater than the predetermined value, and an output section outputting corrected conductivity.

2 Claims, 7 Drawing Sheets

(51) Int. Cl.
*G01N 27/22* (2006.01)
*G01N 33/28* (2006.01)

(56) References Cited

FOREIGN PATENT DOCUMENTS

| | | | |
|---|---|---|---|
| JP | 2017198530 | A | 11/2017 |
| JP | 2019049497 | A | 3/2019 |
| WO | 20190049428 | A1 | 3/2019 |

* cited by examiner

| Name of hydraulic oil | Base oil type | Base oil classifications | Additive | | Conductivity (pS/m) | Conductivity correction value (%) | Relative permittivity | ... |
|---|---|---|---|---|---|---|---|---|
| | | | Type | Content | | | | |
| Hydraulic oil 1 | A1 | Synthetic oil | XX1 | 5% | 2,900 | −1% | 2.1 | ... |
| Hydraulic oil 2 | A1 | Synthetic oil | XX1 | 10% | 4,350 | −5% | 2.2 | ... |
| Hydraulic oil 3 | A1 | Synthetic oil | XX1 | 15% | 5,800 | −10% | 2.3 | ... |
| Hydraulic oil 4 | B2 | Mineral oil | PP1 | 10% | 5,800 | −20% | 2.1 | ... |
| Hydraulic oil 5 | B2 | Mineral oil | PP1 | 5% | 12,000 | −12% | 2.3 | ... |
| Hydraulic oil 6 | D1 | Mineral oil | XX2 | 10% | 2,000 | 0% | 2.1 | ... |
| Hydraulic oil 7 | D1 | Mineral oil | XX2 | 20% | 2,500 | 5% | 2.2 | ... |
| Hydraulic oil 8 | D1 | Mineral oil | XX2 | 30% | 3,000 | 10% | 2.3 | ... |
| Hydraulic oil 9 | D1 | Mineral oil | XX2 | 40% | 3,500 | 15% | 2.4 | ... |
| Hydraulic oil 10 | E3 | Synthetic oil | YY1 | 5% | 6,000 | −5% | 2.0 | ... |
| Hydraulic oil 11 | E3 | Synthetic oil | YY1 | 25% | 9,000 | 10% | 1.9 | ... |
| ... | ... | ... | ... | ... | ... | ... | ... | ... |

FLUID STATE DETECTION SENSOR

TECHNICAL FIELD

Description

The present invention relates to a fluid state detection sensor.

Background Art

In a device where hydraulic actuators such as hydraulic cylinders are arranged, an apparatus is driven by a hydraulic oil supplied from a hydraulic pump.

Such apparatus that circulates and supplies the hydraulic oil is equipped with a fluid state detection sensor that detects a deterioration state of the hydraulic oil in order to keep the apparatus operating smoothly.

In this type of fluid state detection sensor, a pair of electrodes arranged opposite each other are provided in a flow path of the hydraulic oil.

There are a variety of factors that degrade the hydraulic oil, each of which alters electrical parameters such as a conductivity and a relative permittivity.

By applying voltage to the electrodes and detecting the capacitance and resistance values from an inter-electrode voltage value, the relative permittivity and the conductivity of the hydraulic oil are calculated, and the hydraulic oil state is detected by the calculated the relative permittivity and the conductivity of the hydraulic oil (see, Patent Document 1).

PATENT DOCUMENT

Patent Document 1: Japanese Unexamined Patent Application Publication (JP-A) No. 2017-198528 A.

SUMMARY OF INVENTION

Technical Problem

In the fluid state detection sensor described above, where voltage is applied to a pair of electrodes to obtain the conductivity and the relative permittivity, a connection destination of the electrode is switched to a conductivity measurement circuit or a relative permittivity measurement circuit to obtain the conductivity or the relative permittivity in order to improve the measurement accuracy.

However, due to the characteristics of the fluid state detection sensor used, the detection accuracy of conductivity deteriorated when detecting the conductivity of oil types above a predetermined conductivity.

Therefore, in view of the above-mentioned problems, the purpose of the present invention is to provide a fluid state detection sensor that improves a detection accuracy of conductivity in order to detect a hydraulic oil state more accurately.

Solution to Problem

Embodiment 1: One or more embodiments of the present invention propose a fluid state detection sensor comprising:
an electrode section placed in a fluid and configured by a pair of electrodes arranged opposite to each other;
a conductivity acquisition unit comprising a voltage acquisitor configured to acquire an inter-electrode voltage value via an electrode, and a conductivity calculator configured to detect a resistance value from the inter-electrode voltage value acquired at the voltage acquisitor and calculate a conductivity of the fluid;
a memory configured to store correction values for the fluid whose conductivity calculated by the conductivity calculator is greater than a predetermined value; and
a corrector configured to correct the conductivity calculated by the conductivity calculator using a correction value stored in the memory, when the conductivity of the fluid calculated by the conductivity calculator is greater than the predetermined value.

Embodiment 2: One or more embodiments of the present invention propose a fluid state detection sensor,
wherein a fluid is a hydraulic oil,
wherein further comprising a relative permittivity acquisition unit comprising a relative permittivity calculator configured to detect a capacitance value from a inter-electrode voltage value acquired in a voltage acquisitor and calculate a relative permittivity of the hydraulic oil,
wherein a memory stores a database of a plurality of hydraulic oil information items that is linked with information including a base oil type of the hydraulic oil, the conductivity, and the relative permittivity, and
comprising a correction value estimator configured to estimate the correction value of the hydraulic oil to be used using the hydraulic oil information of the hydraulic oil that approximates the hydraulic oil information among the plurality of hydraulic oil information items stored in the database, and stores the estimated correction value in the memory.

DESCRIPTION OF EMBODIMENTS

First Embodiment

A fluid state detection sensor 1 according to the present embodiment will be described below with reference to FIG. 1 and FIG. 2. In this embodiment, the fluid is described below as a hydraulic oil.

<Electrical Configuration of the Fluid State Detection Sensor 1>

Figure 1:
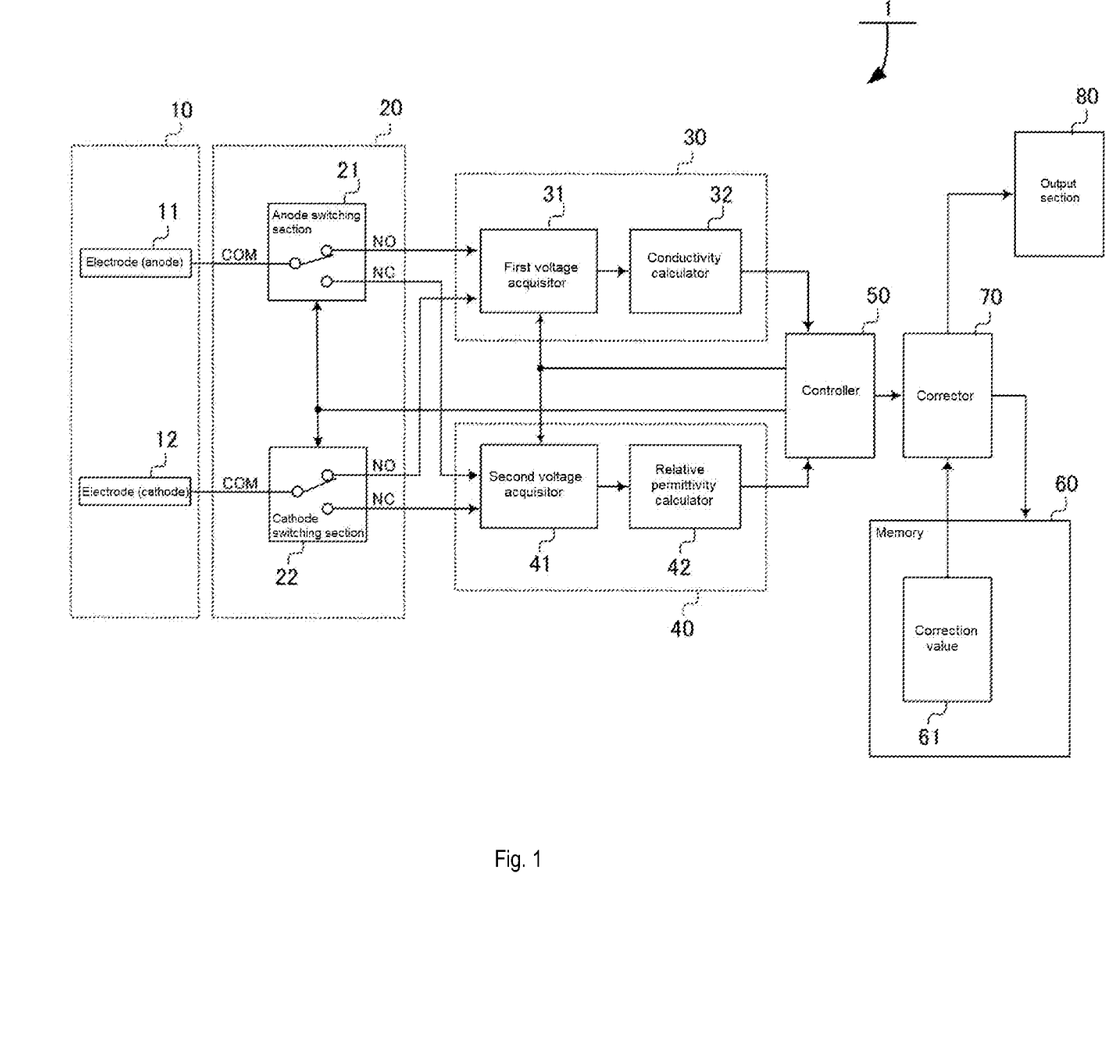
FIG. 1 shows an electrical configuration of a fluid state detection sensor according to a first embodiment of the invention.
Figure 2:
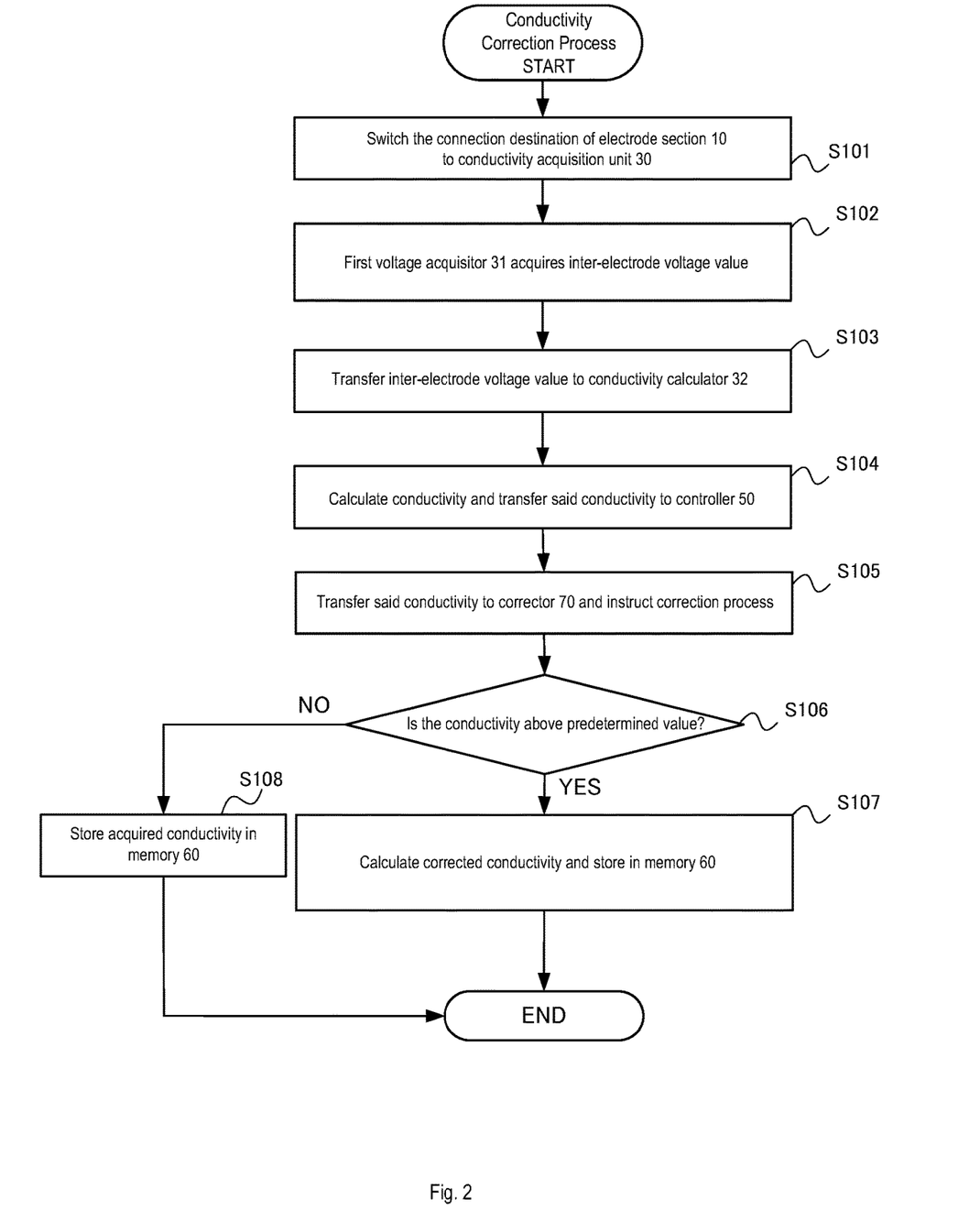
FIG. 2 shows a conductivity correction process flow of the fluid state detection sensor according to the first embodiment of the invention.

As shown in FIG. 1, the fluid state detection sensor 1 comprises an electrode section 10, a switching section 20, a conductivity acquisition unit 30, a relative permittivity acquisition unit 40, a controller 50, a memory 60, a corrector 70, and an output section 80.

The conductivity acquisition unit 30, the relative permittivity acquisition unit 40, the controller 50, the memory 60, and the corrector 70 are part of the functions of the CPU. The memory 60 may be configured external to the CPU.

The electrode section 10 is placed in a flow path of the hydraulic oil and consists of a pair of electrodes arranged opposite each other, including an electrode (anode) 11 and an electrode (cathode) 12.

The electrode (anode) 11 and the electrode (cathode) 12 are arranged opposite each other in a coaxial cylindrical shape.

The switching section 20 comprises an anode switching section 21 and a cathode switching section 22. The anode switching section 21 and the cathode switching section 22 are configured using c-contact relays.

The anode switching section 21 switches the connection destination of the electrode (anode) 11 to either the conductivity acquisition unit 30 or the relative permittivity acquisition unit 40 according to a switching control signal of the controller 50 described further below.

The cathode switching section 22 switches the connection destination of the electrode (cathode) 12 to either the conductivity acquisition unit 30 or the relative permittivity acquisition unit 40 according to the switching control signal of the controller 50 described further below.

The conductivity acquisition unit 30 comprises a first voltage acquisitor 31 as a voltage acquisitor and a conductivity calculator 32.

The first voltage acquisitor 31 acquires the inter-electrode voltage value via the electrode section 10.

The conductivity calculator 32 detects the resistance value from the inter-electrode voltage value acquired in the first voltage acquisitor 31 and calculates the conductivity of the hydraulic oil.

The relative permittivity acquisition unit 40 comprises a second voltage acquisitor 41 as a voltage acquisitor and a relative permittivity calculator 42.

The second voltage acquisitor 41 acquires the inter-electrode voltage value via the electrode section 10.

The relative permittivity calculator 42 detects the capacitance value from the inter-electrode voltage value acquired in the second voltage acquisitor 41 and calculates the relative permittivity of the hydraulic oil.

In this embodiment, a configuration in which voltage acquisitor (the first voltage acquisitor 31 and the second voltage acquisitor 41) are provided in the conductivity acquisition unit 30 and the relative permittivity acquisition unit 40, respectively, to acquire the inter-electrode voltage value is shown as an example, but a common voltage acquisitor may be provided in the conductivity acquisition unit 30 and the relative permittivity acquisition unit 40.

The controller 50 executes the processing of the entire fluid state detection sensor 1 according to a control program stored in ROM (Read Only Memory), etc., which is not shown in the figure.

In this embodiment, the controller 50, for example, outputs a switching control signal to the switching section 20 to switch the electrode section 10 to the conductivity acquisition unit 30 or the relative permittivity acquisition unit 40.

The controller 50 also acquires the conductivity or the relative permittivity calculated in the conductivity acquisition unit 30 or the relative permittivity acquisition unit 40.

The controller 50 also transfers the conductivity output from the conductivity acquisition unit 30 to the corrector 70.

Furthermore, the controller 50 judges the deterioration state of the hydraulic oil based on the conductivity and the relative permittivity calculated by the conductivity acquisition unit 30 or the relative permittivity acquisition unit 40, and causes the display (not shown) to indicate a warning, etc., warning the replacement of the hydraulic oil, etc.

The memory 60 stores a correction value 61 of the hydraulic oil whose conductivity calculated by the conductivity calculator 32 is greater than a predetermined value. An example of the "predetermined value" is 5000 ps/m.

The corrector 70 corrects the conductivity calculated in the conductivity calculator 32 using the correction value 61 stored in the memory 60 when the conductivity of the hydraulic oil calculated by the conductivity calculator 32 is greater than the predetermined value.

The output section 80 outputs the corrected conductivity output from corrector 70 to an external device etc.

<Conductivity Correction Process of Fluid State Detection Sensor 1>

The conductivity correction process of the fluid state detection sensor 1 according to the present embodiment will be described with reference to FIG. 2.

The controller 50 outputs a switching control signal to the switching section 20 to switch the connection destination of the electrode section 10 from the relative permittivity acquisition unit 40 to the conductivity acquisition unit 30 (step S101).

The controller 50 instructs the first voltage acquisitor 31 and the conductivity calculator 32 to acquire the conductivity and causes the first voltage acquisitor 31 to acquire the inter-electrode voltage value (step S102). Here, an acquisition time when acquiring the conductivity may be a time when the voltage between electrodes is sufficiently stable.

The first voltage acquisitor 31 transfers the acquired inter-electrode voltage value to the conductivity calculator 32 (step S103).

The conductivity calculator 32 calculates conductivity based on a resistance detected from the inter-electrode voltage value transferred from the first voltage acquisitor 31, and transfers the calculated conductivity to the controller 50 (step S104).

The controller 50 transfers the conductivity transferred from the conductivity calculator 32 to the corrector 70 and instructs the corrector 70 to perform the correction process (step S105).

The corrector 70 determines whether the conductivity transferred from the controller 50 is greater than or equal to the predetermined value (step S106).

When the corrector 70 determines that the conductivity transferred from the controller 50 is greater than or equal to the predetermined value ("YES" in step S106), it retrieves the correction value 61 corresponding to a hydraulic oil type being used from the memory 60.

The corrector 70 corrects the conductivity transferred from the controller 50 using the retrieved correction value, stores the corrected conductivity in the memory 60, and outputs it to the output section 80. (Step S107)

The output section 80 outputs the corrected conductivity output from corrector 70 to the external device etc.

On the other hand, if the corrector 70 determines that the conductivity transferred from the controller 50 is not greater than the predetermined value ("NO" in step S107), it stores the conductivity transferred from the controller 50 in the memory 60, transfers it to the output section 80, and terminates the conductivity correction process (step S108).

Effects of First Embodiment

The fluid state detection sensor 1 according to this embodiment comprises the electrode section 10, which is placed in the hydraulic oil and consists of a pair of electrodes arranged opposite each other, the switching section 20, the first voltage acquisitor 31 that acquires the inter-electrode voltage value through the electrode section 10, the conductivity acquisition unit 30 comprising a conductivity calculator 32 that detects resistance values from the inter-electrode voltage value acquired in the first voltage acquisitor 31 and calculates the conductivity of hydraulic oil, the memory 60 that stores a correction value for the hydraulic oil whose conductivity calculated by the conductivity calculator 32 is greater than the predetermined value, the corrector 70 that corrects the conductivity calculated in the conductivity calculator 32 using the correction value stored in the memory 60 when the conductivity of the hydraulic oil calculated by the conductivity calculator 32 is greater than the predetermined value, and the output section 80 that outputs the corrected conductivity.

In other words, the corrector 70 corrects the conductivity calculated in the conductivity calculator 32 using the correction value stored in the memory 60 when the conductivity of the hydraulic oil calculated by the conductivity calculator 32 is above the predetermined value.

Therefore, when the conductivity of the hydraulic oil calculated by the conductivity calculator 32 is higher than the predetermined value, the accuracy of conductivity detection can be improved by using the corrected conductivity.

According to the fluid state detection sensor 1, the measurement accuracy of the conductivity can be improved and the hydraulic oil state can be detected more accurately.

Second Embodiment

A fluid state detection sensor 1A according to this embodiment will be described below with reference to FIG. 3 to FIG. 7.
<Electrical Configuration of Fluid State Detection Sensor 1A>

Figure 3:
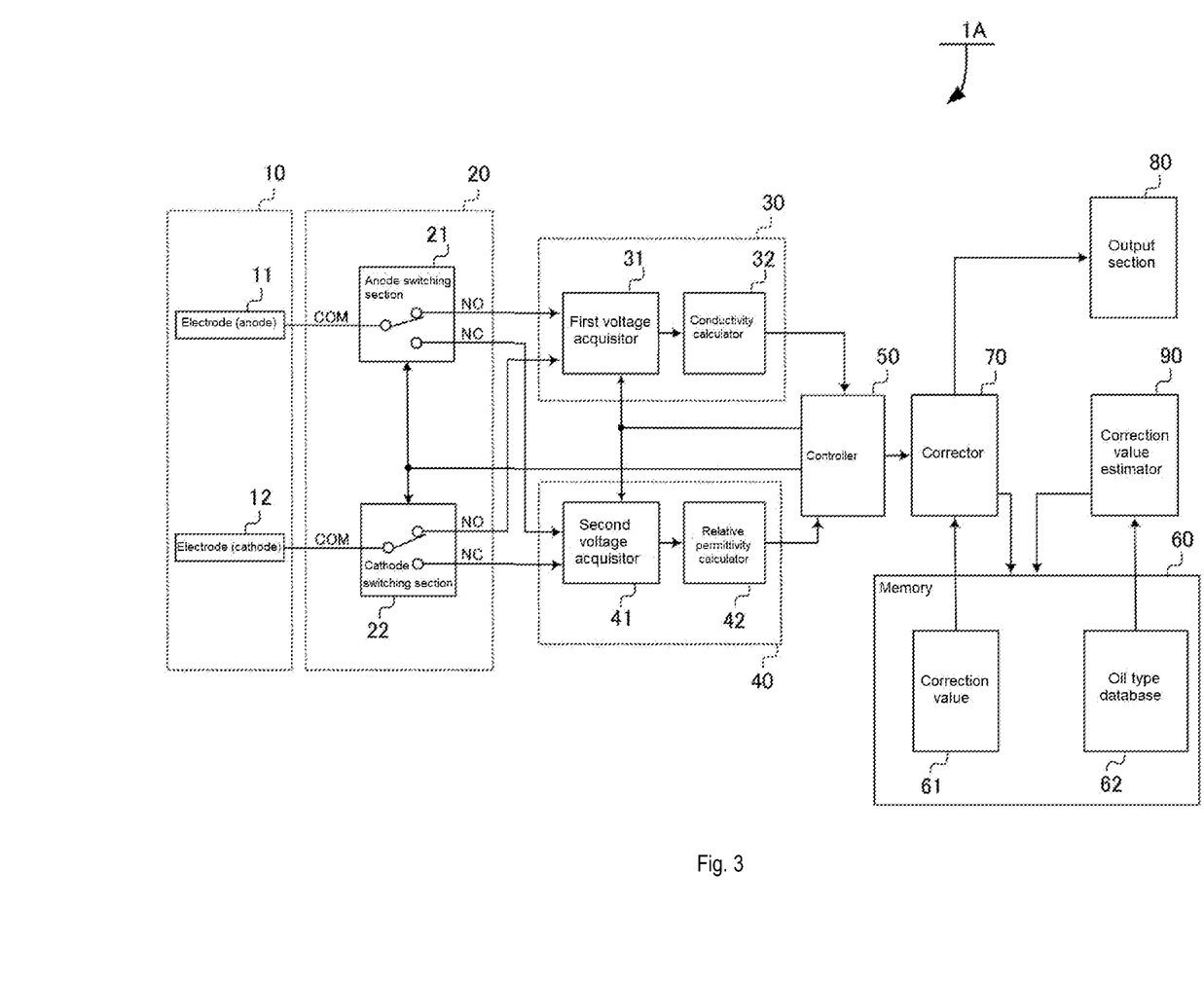
FIG. 3 shows the electrical configuration of the fluid state detection sensor according to a second embodiment of the invention.

As shown in FIG. 3, the fluid state detection sensor 1A comprises an electrode section 10, a switching section 20, a conductivity acquisition unit 30, a relative permittivity acquisition unit 40, a controller 50, a memory 60, a corrector 70, an output section 80, and a correction value estimator 90.

The components with the same symbols as in the first embodiment perform the same functions, and therefore, a detailed description of them is omitted. The conductivity acquisition unit 30, the relative permittivity acquisition unit 40, the controller 50, the memory 60, the corrector 70, the output section 80, and the correction value estimator 90 are part of the CPU functions.

The correction value estimator 90 estimates the conductivity correction value of a hydraulic oil to be used, using the hydraulic oil information of the hydraulic oil that approximates the hydraulic oil information of the plurality of hydraulic oil information items stored in a database 62.

The correction value estimator 90 then stores an estimated correction value in the memory 60.

Figure 4:
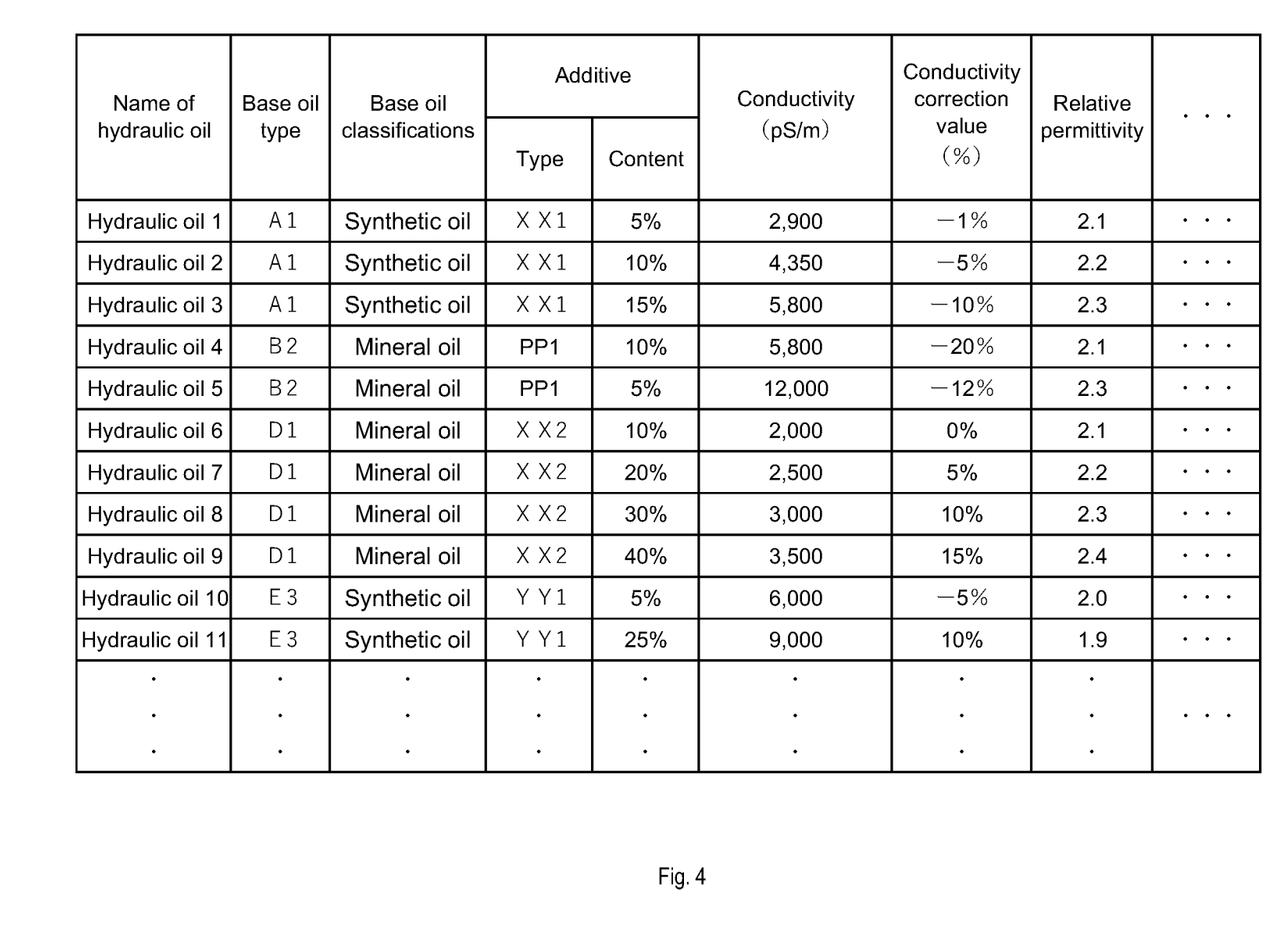
FIG. 4 shows a database stored in the memory of the fluid state detection sensor according to the second embodiment of the invention.

As shown in FIG. 4, the database 62 is tied to the hydraulic oil information including the base oil type, additive content, the conductivity, and the relative permittivity of the hydraulic oil (e.g., hydraulic oil base oil type, additive type, additive content, conductivity, and relative permittivity), and stored in the memory 60.

Here, "approximate" can be exemplified as the case where, for example, the base oil and additives are the same among the above hydraulic oil information.
<Estimation Process of Conductivity Correction Value for Fluid State Detection Sensor 1A>

Figure 5:
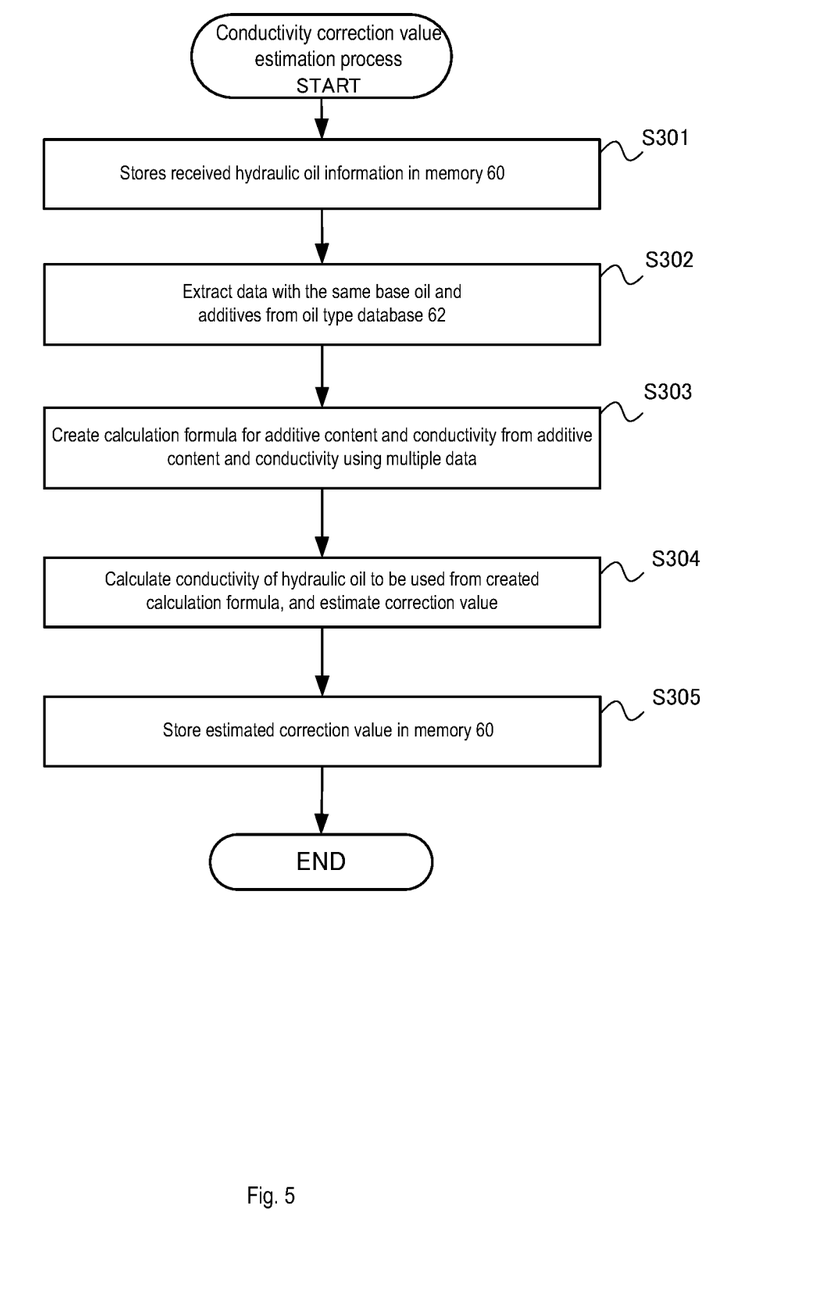
FIG. 5 shows a conductivity correction value estimation process flow of the fluid state detection sensor according to the second embodiment of the invention.

The estimation process of conductivity correction value of the fluid state detection sensor 1A according to this embodiment will be described with reference to FIG. 5.

The correction value estimator 90 obtains the hydraulic oil information of the hydraulic oil to be used, which is received from a keyboard or other input section not shown in the figure, and stores it in the memory 60 (step S301).

The correction value estimator 90 compares the received hydraulic oil information of the hydraulic oil to be used with the hydraulic oil information of the hydraulic oil stored in the memory 60, and extracts, for example, the hydraulic oil information with the same base oil and additives from the database 62. (Step S302).

Specifically, when the hydraulic oil information of the hydraulic oil to be used was the base oil type of A1 and the additive type of XX1, the correction value estimator 90 extracts the hydraulic oil information of hydraulic oil 1, hydraulic oil 2, and hydraulic oil 3 that are the same as the base oil type and additive type of the hydraulic oil to be used, but have different contents of additive type XX1 using FIG. 4, for example.

The correction value estimator 90 uses the information on the content and conductivity of the plurality of additives extracted from the database 62 to create a calculation formula representing the relationship between the content and conductivity of the additives. (Step S303).

Figure 6:
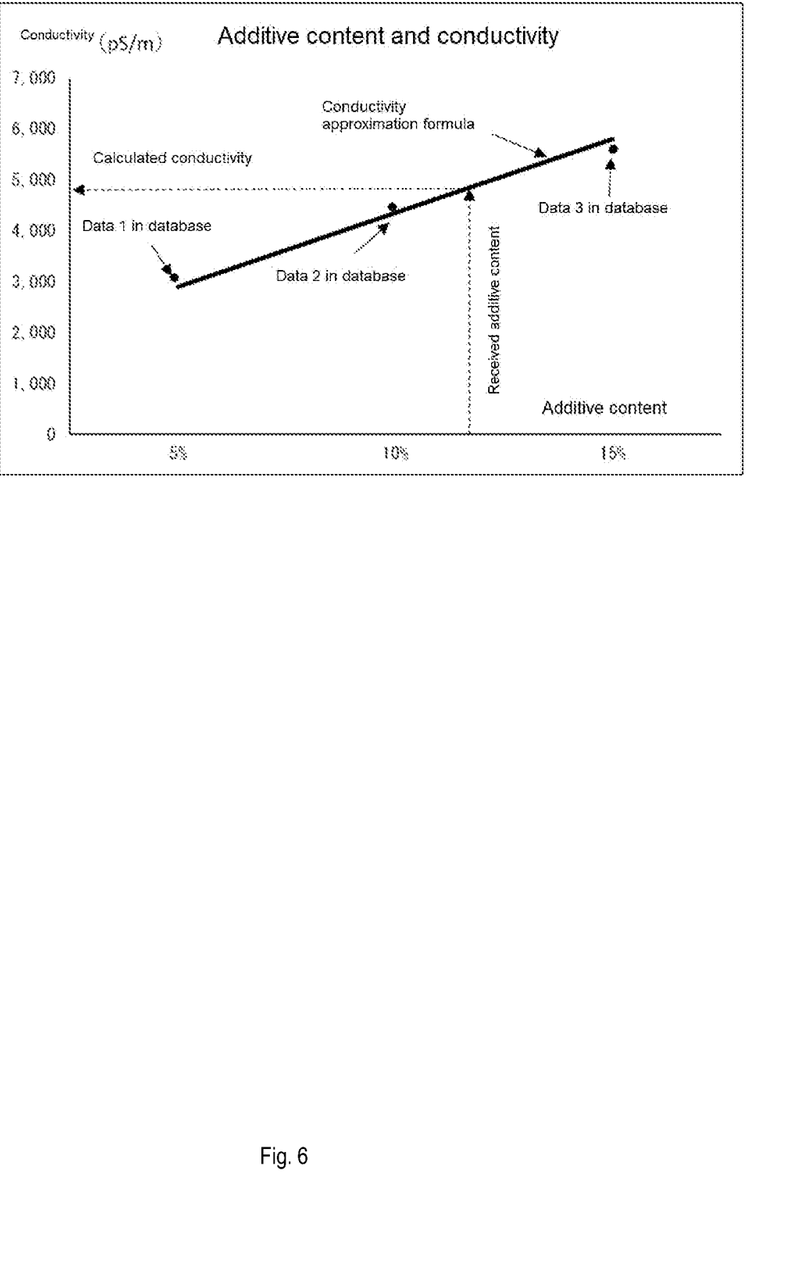
FIG. 6 shows a process of calculating conductivity performed by a correction value estimator of the fluid state detection sensor according to the second embodiment of the invention using the information in the database.

In the above example, the calculation formula can be an approximate straight line for multiple points, with the additive content on the X-axis and the conductivity on the Y-axis, as shown in FIG. 6.

Based on the additive content of the received hydraulic oil to be used, the correction value estimator 90 calculates the conductivity of the hydraulic oil to be used and estimates the conductivity correction value using the calculation formula for the relationship between the calculated additive content and conductivity. (Step S304).

Figure 7:
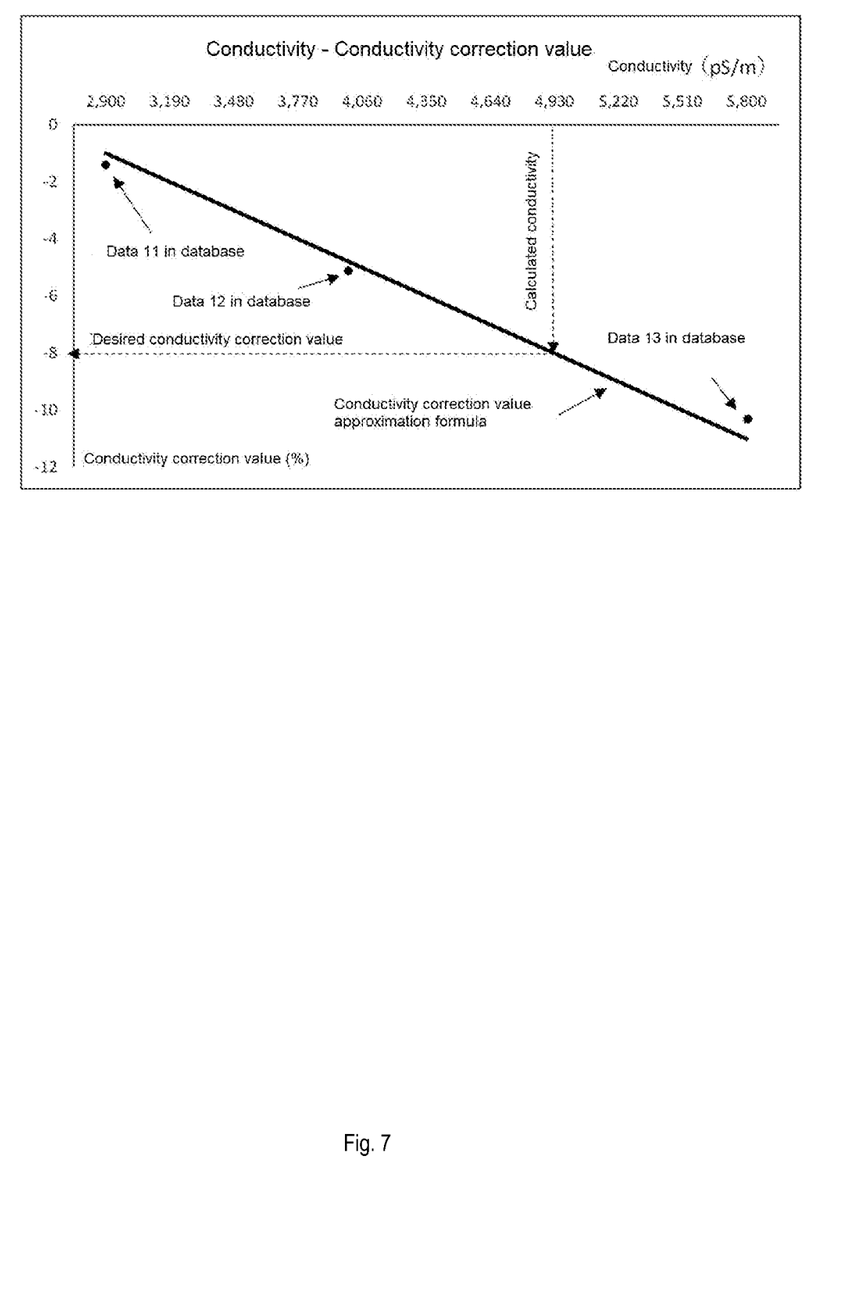
FIG. 7 shows the process of calculating conductivity correction values performed by the correction value estimator of the fluid state detection sensor according to the second embodiment of the invention using information in the database.

In the above example, the calculation formula can be the approximate straight line for multiple points, with the conductivity on the X-axis and the conductivity correction value on the Y-axis, as shown in FIG. 7.

Specifically, for example, the correction value estimator 90 calculates the conductivity indicated by the dashed arrows in FIG. 6 based on the additive content of the received hydraulic oil to be used, using the approximate straight line in FIG. 6, and estimates the −8% indicated by the dashed arrows in FIG. 7 as the conductivity correction value based on the calculated conductivity.

The correction value estimator 90 stores the estimated conductivity correction value and the hydraulic oil information of the hydraulic oil to be used in the memory 60, and terminates the conductivity correction value estimation process (step S305).

When storing the estimated conductivity correction value and the hydraulic oil information of the hydraulic oil to be used in the memory 60, the hydraulic oil information of the hydraulic oil to be used and the estimated conductivity correction value may be linked and stored in the database 62 as well.

The hydraulic oil information of the hydraulic oil to be used and the estimated conductivity correction value may be linked and stored in any area in memory 60.

Effects of Second Embodiment

The fluid state detection sensor 1A according to this embodiment is a sensor for detecting the hydraulic oil state and comprises the electrode section 10, the switching section 20, the conductivity acquisition unit 30, the relative permittivity acquisition unit 40, the controller 50, the memory unit 60, the corrector 70, the output section 80, and the correction value estimator 90.

The correction value estimator 90 retrieves, for example, input information from the keyboard or the like not shown in the figure, or the hydraulic oil information of the hydraulic oil to be used, including the relative permittivity calculated by the relative permittivity acquisition unit 40, from the database 62 stored in the memory 60. The correction value estimator 90 uses the plurality of the hydraulic oil information items stored in the database 62 to create the calculation formula that derives the conductivity of the hydraulic oil to be used. The correction value estimator 90 uses the created calculation formula to calculate the conductivity of the hydraulic oil to be used and estimates the conductivity correction value.

The correction value estimator 90 then stores the estimated conductivity correction value in the memory 60.

In other words, the correction value estimator 90 estimates the correction value for conductivity of the hydraulic oil to be used using the plurality of hydraulic oil information items stored in the database, such as the base oil type, the conductivity or the relative permittivity, and stores the estimated correction value for conductivity of the hydraulic oil to be used in the memory 60.

Therefore, even if a hydraulic oil whose correction value is unknown up to now is used, a suitable correction value for conductivity can be used, and the detection accuracy of conductivity can be improved.

According to the fluid state detection sensor 1A, the measurement accuracy of the conductivity can be improved and the condition of the hydraulic oil can be detected more accurately.

Modifications

In the second embodiment, the plurality of information stored in the database 62 is used to create the calculation formula to derive the conductivity of the hydraulic oil to be used, calculate the conductivity of the hydraulic oil to be used, and estimate a conductivity correction value. However, the correction value estimator 90 may estimate the conductivity correction value as the difference between the conductivity of the hydraulic oil to be used and the conductivity of the hydraulic oil comprising a certain range of similarity, when, of the hydraulic fluid information stored in database 62, including the base oil type, the additive type, the additive content, the conductivity, and the relative permittivity of the hydraulic fluid, the base oil type of the hydraulic oil to be used and the additive type match, and when the additive content and the relative permittivity are similar within a certain range.

The first embodiment, the second embodiment, and variations thereof have been described above. According to the fluid state detection sensor of the first embodiment of the invention, when the conductivity of the fluid calculated by the conductivity calculator is higher than the predetermined value, the corrector corrects the conductivity calculated by the conductivity calculator using the correction value stored in the memory.

Therefore, the detection accuracy of the conductivity of the fluid calculated by the conductivity calculator can be improved.

According to the second embodiment of the invention and the fluid state detection sensor of the variant, the correction value estimator estimates the correction value of the hydraulic oil to be used by using the hydraulic oil information of the hydraulic oil that the hydraulic oil information approximates among the plurality of hydraulic oil information items such as the base oil type, the conductivity or the relative permittivity stored in the database, and stores the estimated correction value of the conductivity of the hydraulic oil to be used in the memory.

Therefore, even if the hydraulic oil whose correction value is unknown up to now is used, it is possible to use the suitable correction value for conductivity, and the detection accuracy of conductivity can be improved.

As described above in the first embodiment, the second embodiment, and variations thereof of the present invention, the fluid state detection sensors of these embodiments have the effect of accurately detecting the fluid state by obtaining highly accurate conductivity.

Although embodiments of this invention have been described in detail with reference to the drawings, specific configurations are not limited to these embodiments, and include designs and the like that do not depart from the gist of this invention.

EXPLANATION OF THE REFERENCE NUMERALS

1: fluid state detection sensor
1A: fluid state detection sensor
10: electrode section
11: electrode (anode)
12: electrode (cathode)
20: switching section
21: anode switching section
22: cathode switching section
30: conductivity acquisition unit
31: first voltage acquisitor
40: relative permittivity acquisition unit
41: second voltage acquisitor
50: controller
60: memory
70: corrector
80: output section
90: correction value estimator

What is claimed is:
1. A fluid state detection sensor comprising:
an electrode section placed in a fluid and configured by a pair of electrodes arranged opposite to each other;
a conductivity acquisition unit comprising a voltage acquisitor configured to acquire an inter-electrode voltage value via the electrode section, and a conductivity calculator configured to detect a resistance value from the inter-electrode voltage value acquired at the voltage acquisitor and calculate a conductivity of the fluid;
a memory configured to respectively store a base oil type, a conductivity of the base oil, and a correction value of the conductivity of the base oil whose conductivity is greater than a predetermined value;

a corrector configured to correct the conductivity calculated by the conductivity calculator using the correction value stored in the memory;

a relative permittivity acquisition unit; and a correction value estimator, wherein the fluid is a hydraulic oil, wherein the relative permittivity acquisition unit comprises a relative permittivity calculator configured to detect a capacitance value from the inter-electrode voltage value acquired in the voltage acquisitor and calculate a relative permittivity of the hydraulic oil, wherein the memory stores a database of a plurality of hydraulic oil information items that is linked with information including a base oil type of the hydraulic oil, the conductivity, and the relative permittivity, and wherein the correction value estimator is configured to estimate the correction value of a hydraulic oil to be used using the hydraulic oil information of the hydraulic oil that approximates the hydraulic oil information among the plurality of hydraulic oil information items stored in the database, and to store the estimated correction value in the memory.

2. A fluid state detection sensor comprising:

an electrode section placed in a hydraulic oil and configured by a pair of electrodes arranged opposite to each other;

a conductivity acquisition unit comprising a voltage acquisitor configured to acquire an inter-electrode voltage value via the electrode section, and a conductivity calculator configured to detect a resistance value from the inter-electrode voltage value acquired at the voltage acquisitor and calculate a conductivity of the hydraulic oil;

a memory that stores an additive content value, a conductivity value, and a conductivity correction value in association with each of a plurality of hydraulic oils;

a corrector that determines whether the conductivity of the hydraulic oil calculated by the conductivity calculator is equal to or greater than a predetermined value, and corrects the conductivity value based on the conductivity correction value associated with the same hydraulic oil, if the conductivity is equal to or greater than the predetermined value;

a first approximation line calculator that acquires an input additive content value for a hydraulic oil to be used, and calculates a first approximation line showing a relationship between conductivity values and additive content values based on conductivity values and content values associated with hydraulic oils whose base oil type is the same as that of the hydraulic oil to be used;

a calculation unit that calculates a conductivity value of the hydraulic oil to be used based on the input content value and the first approximation line;

a second approximation line calculator that calculates a second approximation line showing a relationship between conductivity values and conductivity correction values based on the conductivity values and conductivity correction values associated with the hydraulic oils whose base oil type is the same as that of the hydraulic oil to be used;

a correction value estimator that calculates a conductivity correction value of the hydraulic oil to be used based on the conductivity value of the hydraulic oil to be used calculated by the calculation unit and the second approximation line; and a storage that stores the input content value, the conductivity value calculated by the calculation unit, and the conductivity correction value calculated by the correction value estimation unit in the storage unit in association with the hydraulic oil to be used.

* * * * *